UNITED STATES PATENT OFFICE.

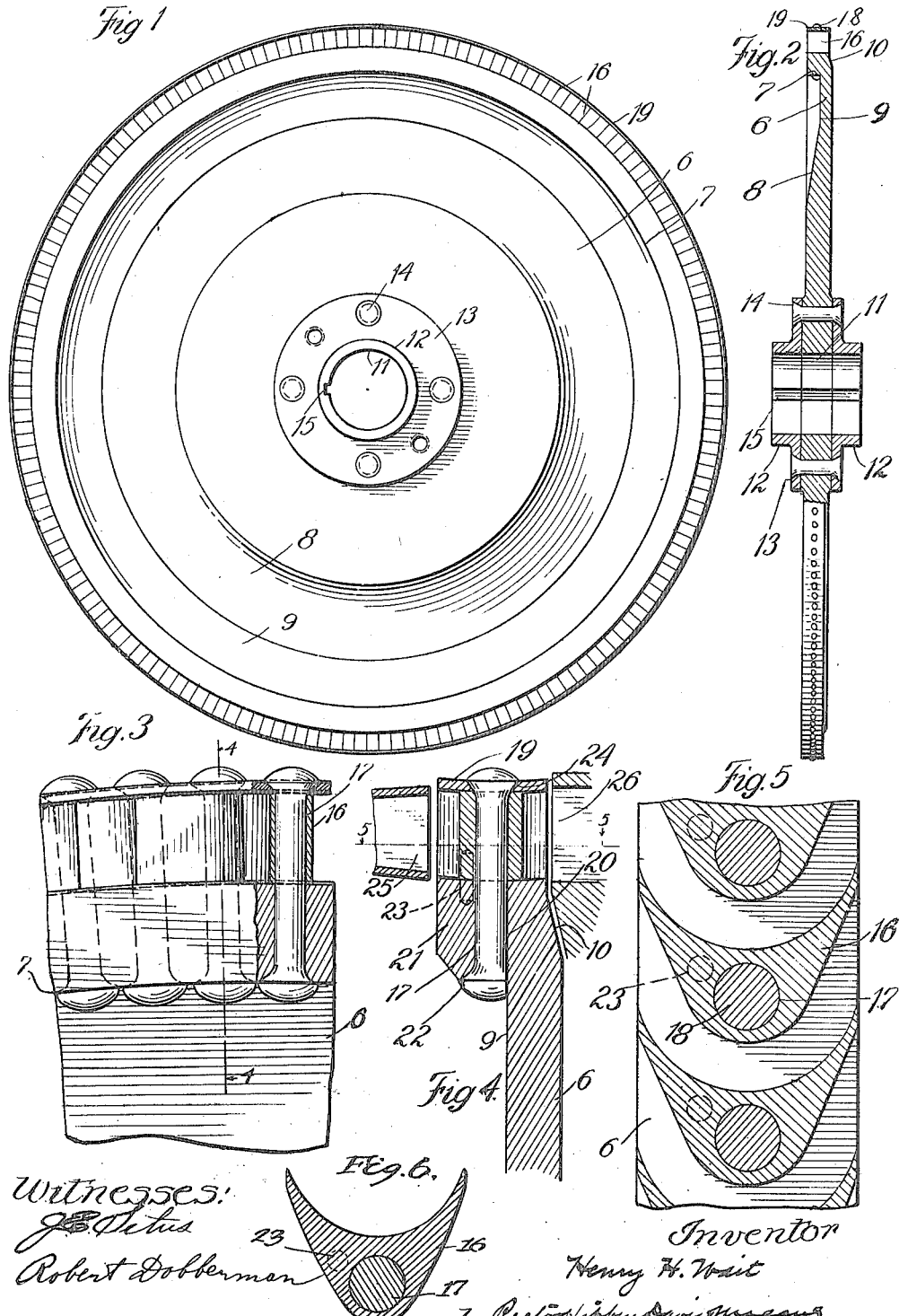

HENRY H. WAIT, OF CHICAGO, ILLINOIS.

WHEEL FOR STEAM-TURBINES.

1,266,889.  Specification of Letters Patent.  Patented May 21, 1918.

Application filed May 1, 1916. Serial No. 94,680.

*To all whom it may concern:*

Be it known that I, HENRY H. WAIT, a citizen of the United States, residing at Chicago, in the county of Cook and State of Illinois, have invented certain new and useful Improvements in Wheels for Steam-Turbines, of which the following is a specification.

My invention relates more particularly to that type of impact turbine in which the steam is directed against the buckets of the wheel from the side of the wheel rather than radially thereof, and passing across the periphery of the wheel between the buckets leaves the wheel from the opposite face thereof. Turbine wheels which are traversed by the steam in this manner are commonly constructed with a band or shroud surrounding the buckets. The object of my invention is to construct a wheel of this general character which shall be strong and rigid, simple in construction and have the necessary tensile strength so distributed as to avoid its flying apart under the enormous centrifugal strains to which such wheels are subjected without being unduly heavy, and shall be relatively inexpensive to manufacture.

In the accompanying drawing I have shown a preferred form of my invention, and in the following specification described the same in detail. It is to be understood, however, that the specific disclosure is for the purpose of exemplification only and that the scope of the invention is defined in the following claims in which I have endeavored to distinguish it from the prior art so far as known to me without, however, relinquishing or abandoning any part or feature thereof.

In the drawings Figure 1 is a face view of a preferred embodiment of my invention; Fig. 2 a side elevation of the same partly in diametrical section; Fig. 3 an enlarged detail in side elevation partly in section of a portion of the rim of the wheel; Fig. 4 a cross section thereof on the line 4—4 of Fig. 3; Fig. 5 a cross-section on the line 5—5 of Fig. 4 on a still greater scale; Fig. 6 is a similar section of one of the blades.

The body of the wheel I preferably form from a circular disk of steel plate such as is found upon the market of the required thickness, which must be such in view of the character of the metal of which it is composed as to provide at the central portion of the wheel where the centrifugal strains are concentrated, a sufficient body of metal to prevent the wheel exploding when driven at full speed. Toward the periphery of the disk where the centrifugal force is more distributed it is thinned by cutting away as at 6, forming an annular groove or depression in one side of the disk, the outer wall 7 of which is substantially perpendicular to, and the inner wall 8 tapering or merging into the inner plane surface of the disk, the intermediate bottom portion 9 being substantially parallel to the plane face of the wheel. The opposite face of the wheel is cut away on a bevel or chamfered as at 10 narrowing the peripheral surface of the disk to which the buckets are attached, as will presently appear.

In order to provide a suitable support for the wheel upon its shaft I form a concentric bore 11 therein and secure to the disk on opposite sides thereof flanged hubs 12 which are secured in position upon the wheel by rivets 14 extending through the flanges 13 thereof. The hubs and disk are bored together to make a suitable bearing for mounting upon the shaft of the turbine to which latter the wheel may be keyed by means of the key-way 15.

The blades or buckets 16 are of the concavo-convex form shown in Fig. 5 and are secured to the wheel by bolts or rivets 18 fitted in holes 17 substantially concentric with the central rear surface of the buckets and spaced from the front or concave faces thereof slightly farther than from the rear faces so that in the event that the buckets or any of them are deformed by the swelling of the rivets the deformation will be in the rear rather than the front face of the bucket and so not affect the continuous curve of the bucket face which receives the impact of the steam. A band or shroud 19 surrounds the buckets, the shroud and buckets being secured to the wheel by means of the bolts 18 which are inserted through holes 20 drilled for that purpose in the lateral flange 21, formed on the wheel by cutting the same away as above described, and projected through the blades and band, the latter being perforated for the purpose, and upset beyond the latter. The centrifugal action of the weight of the flange 21, the buckets and band impose a lateral or bending strain upon the wheel at the junction of the flange 21 and the body of the disk, and also upon the bolts or rivets at their inner ends. In order to provide resistance to the centrifugal strain and the effects of distortion from various causes, the bolts are flared adjacent their heads 22. By this construction there is a gradual increase in cross-section of the bolts from the body portion to the head, and there is consequently no point where there is a sudden change of stress which would be liable to make a place where a fracture would tend to start.

There is a tendency to have distorting forces at either head of the bolt and by the present arrangement the smallest section of the bolt simply passes through the holes in the wheel rim and the blades and can practically only be subjected to a straight pull. Thus both the wheel and bolt are designed to provide the strength where needed at the portion thereof where a bending strain is imposed upon them. Except at the strengthened portion the strain upon the bolts is practically a straight pull or tension which the body of the bolt is amply able to sustain.

In order to reduce as far as possible the bending strain and, consequently that the bolts may approach as nearly as possible in their location, the central plane of the disk, the heads of the bolts are cut away upon the side which is turned toward the disk face and the bolt holes 20 are almost tangent to the adjacent face of the disk. To prevent shifting or turning of the blades or buckets after they are placed in position, I use dowel pins 23 which are placed as best shown in Fig. 5, and extend into the metal of the buckets and the rim or flange of the wheel at their opposite ends. The perforations in the band or shroud and the outer ends of the bolt holes 17 for the reception of the bolts are preferably countersunk as at 24, and after the parts are assembled the bolts are upset over the band and into the enlarged ends of the holes. The buckets are preferably formed from a rod of metal of suitable cross-section by dividing it into suitable sections upon planes perpendicular to the length thereof and therefore unless provision were made to the contrary the ends of the buckets adjacent the edges of the wheel would not lie snugly against the periphery thereof because of the curvature of the wheel, thus leaving slight openings for the escape of steam. In order to avoid this disadvantage I form the periphery of the disk or wheel slightly concave in an axial direction sufficiently to compensate for the convex curvature, whereby the ends or wings of the buckets are caused to lie flush with the surface of the periphery of the wheel. (See Figs 3 and 4, in the former of which the bottom of the concavity is shown in dotted lines). This not only has the effect of avoiding any crevices in the location stated but assists in preventing the rotation of the buckets. The chamfering of the face of the wheel to which attention has been called narrows the periphery thereof and brings the bolt-holes into a line midway between the edges of the periphery.

In Fig. 4 I have indicated the nozzle 25 for directing steam to the wheel and the passages 26 for conveying it away. It will be noted that the nozzle 25 is of less depth radially than the buckets of the wheel while the exhaust passage is slightly greater thus preventing the discharge of steam against a dead surface with consequent loss of power.

I claim:

1. A turbine wheel having a laterally projecting flange, an external band, blades intermediate the periphery of said wheel and said band, and a single radial bolt extending through each of said blades, said flange and band and securing them together.

2. A turbine wheel having a laterally projecting flange, an external band, blades intermediate the periphery of said wheel and said band, a single radial bolt flared adjacent the head thereof inserted through each of said blades, the flange, and band and securing the same together.

3. A turbine wheel having a laterally projecting flange, an external band, blades intermediate the periphery of said wheel and said band, and bolts extending through said flange, band and blades and securing them together, the inner contiguous face of the wheel being substantially tangential to said bolts.

4. A turbine wheel having a laterally projecting peripheral flange upon one side thereof and a chamfer adjacent its periphery upon its opposite face, a band surrounding said wheel, buckets mounted between the band and wheel, and means for securing the band and buckets in position upon the periphery of the wheel, consisting of bolts extending through the center of the body-portion of said blades and through said flange and band and securing them together.

5. A turbine wheel having a laterally projecting flange, buckets arranged upon the periphery of the wheel, a band surrounding the buckets, and a series of bolts extending through the flange, buckets and band, the bolts being cut away upon one side and located closely adjacent to the plane of the contiguous face of the wheel.

6. A turbine wheel and external band thereon, blades interposed between the periphery of said wheel and said band, a single bolt extending through each of said blades and said band and securing them to the periphery of the wheel, and dowel pins for preventing the rotation of the blades on the bolts.

7. A turbine wheel comprising a disk having a lateral peripheral flange upon one face thereof, and chamfered upon its opposite face adjacent its periphery, a series of blades seated upon the periphery of the wheel, and included between the edges of said periphery, a band surrounding said blades, and a series of bolts extending through said flange, blades and band, the inner contiguous face of the wheel being substantially tangent to said bolts.

8. A turbine wheel comprising a circular disk of metal plate cut away adjacent its periphery to form an annular groove and projecting flange on one face thereof, a series of buckets upon the periphery of said disk, a band surrounding said series of buckets and a series of bolts extending through said band and each through the center of the body of a bucket and securing the said bucket to the flange of the disk.

9. A turbine wheel comprising a disk of plate metal cut away upon one side thereof to form an annular groove and an overlying flange, a chamfer upon the other face thereof, a series of buckets surrounding the periphery of the wheel, a bolt passing through the body of each said bucket and through said flange and band and securing the same together.

10. A turbine wheel comprising a circular disk the periphery of which is concave in an axial direction and a series of buckets arranged about the periphery of the disk, the surfaces of the buckets in contact with the periphery being substantially plane.

11. A turbine wheel comprising a circular disk, a series of concavo-convex buckets arranged about the periphery of the disk, a rivet for securing each bucket to the disk and being substantially concentric to the rear surface of the bucket.

12. A turbine wheel comprising a circular disk, a series of concavo-convex buckets arranged about the periphery of the disk, a rivet for securing each bucket to the disk spaced farther from the front surface of said bucket than from the rear surface thereof.

HENRY H. WAIT.